United States Patent [19]
Hetherington et al.

[11] Patent Number: 5,948,106
[45] Date of Patent: Sep. 7, 1999

[54] SYSTEM FOR THERMAL OVERLOAD DETECTION AND PREVENTION FOR AN INTEGRATED CIRCUIT PROCESSOR

[75] Inventors: Ricky C. Hetherington, Pleasanton; Ramesh Panwar, Santa Clara, both of Calif.

[73] Assignee: Sun Microsystems, Inc., Palo Alto, Calif.

[21] Appl. No.: 08/882,613

[22] Filed: Jun. 25, 1997

[51] Int. Cl.[6] .................................................. G06F 15/00
[52] U.S. Cl. .............................. 713/501; 712/23; 712/43; 712/217; 712/232; 712/239
[58] Field of Search ................ 712/23, 43, 217, 712/232, 239; 713/501; 395/37.5, 425

[56] References Cited

U.S. PATENT DOCUMENTS

| | | | |
|---|---|---|---|
| 5,134,561 | 7/1992 | Liptay | 395/425 |
| 5,487,156 | 1/1996 | Popescu et al. | 395/375 |
| 5,502,838 | 3/1996 | Kikinis | 395/556 |
| 5,560,032 | 9/1996 | Nguyen et al. | 395/800 |
| 5,561,776 | 10/1996 | Popescu et al. | 395/375 |
| 5,625,837 | 4/1997 | Popescu et al. | 395/800 |
| 5,798,667 | 8/1998 | Herbert | 327/573 |

OTHER PUBLICATIONS

Sun Microsystems, Inc., "UltraSPARC–II High Performance 64–bit RISC Processor Application Note," Jul. 1996.
Sun Microsystems Computer Corporation, "The Super SPARC Microprocessor, Technical White Paper," May 1992.
Intel, "Introduction to the Intel Architecture," 1997.
Motorola, Inc., "PowerPC 620 RISC Microprocessor Technical Summary," Jul. 1996.
Cyrix, "6x86MX Processor," May 19, 1997.
Sun Microelectronics, "The UltraSPARC Processor—Technology White Paper," Aug. 27, 1997.

*Primary Examiner*—Albert De Cady
*Assistant Examiner*—Jason Greene
*Attorney, Agent, or Firm*—William J. Kubida; Robert H. Kelly; Holland & Hart LLP

[57] ABSTRACT

A system and method for thermal overload detection and protection for a processor which allows the processor to run at near maximum potential for the vast majority of its execution life. This is effectuated by the provision of circuitry to detect when the processor has exceeded its thermal thresholds and which then causes the processor to automatically reduce the clock rate to a fraction of the nominal clock while execution continues. When the thermal condition has stabilized, the clock may be raised in a stepwise fashion back to the nominal clock rate. Throughout the period of cycling the clock frequency from nominal to minimum and back, the program continues to be executed. Also provided is a queue activity rise time detector and method to control the rate of acceleration of a functional unit from idle to full throttle by a localized stall mechanism at the boundary of each stage in the pipe. This mechanism can detect when an idle queue is suddenly overwhelmed with input such that over a short period of approximately 10–20 machine cycles, the queue activity rate has increased from idle to near stall threshold.

9 Claims, 6 Drawing Sheets

SYSTEM FOR THERMAL OVERLOAD DETECTION AND PREVENTION FOR AN INTEGRATED CIRCUIT PROCESSOR

CROSS-REFERENCES TO RELATED APPLICATIONS

The subject matter of the present application is related to that of co-pending U.S. patent application Ser. No. 08/881,958 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/881,173 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 for APPARATUS FOR DYNAMICALLY RECONFIGURING A PROCESSOR filed concurrently herewith by Ramesh Panwar and Ricky C. Hetherington; Ser. No. 08/881,732 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 for APPARATUS FOR TRACKING PIPELINE RESOURCES IN A SUPERSCALAR PROCESSOR filed concurrently herewith by Ramesh Panwar; Ser. No. 08/882,525 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 for NON-BLOCKING HIERARCHICAL CACHE THROTTLE filed concurrently herewith by Ricky C. Hetherington and Thomas M. Wicki; Ser. No. 08/881,727 for NON-THRASHABLE NON-BLOCKING HIERARCHICAL CACHE filed concurrently herewith by Ricky C. Hetherington, Sharad Mehrotra and Ramesh Panwar; and Ser. No. 08/881,065 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar, the disclosures of which applications are herein incorporated by this reference.

BACKGROUND OF THE INVENTION

The present invention relates, in general, to the field of integrated circuit ("IC") devices. More particularly, the present invention relates to a system and method for thermal overload detection and prevention for a processor or other high speed, high density integrated circuit devices.

Early computer processors (also called microprocessors) included a central processing unit or instruction execution unit that executed only one instruction at a time. As used herein the term processor includes complete instruction set computers ("CISC"), reduced instruction set computers ("RISC") and hybrids. In response to the need for improved performance several techniques have been used to extend the capabilities of these early processors including pipelining, superpipelining, superscaling, speculative instruction execution, and out-of-order instruction execution.

Pipelined architectures break the execution of instructions into a number of stages where each stage corresponds to one step in the execution of the instruction. Pipelined designs increase the rate at which instructions can be executed by allowing a new instruction to begin execution before a previous instruction is finished executing. Pipelined architectures have been extended to "superpipelined" or "extended pipeline" architectures where each execution pipeline is broken down into even smaller stages (i.e., microinstruction granularity is increased). Superpipelining increases the number of instructions that can be executed in the pipeline at any given time.

"Superscalar" processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. The number of instructions that may be processed is increased due to parallel execution. Each of the execution pipelines may have differing number of stages. Some of the pipelines may be optimized for specialized functions such as integer operations or floating point operations, and in some cases execution pipelines are optimized for processing graphic, multimedia, or complex math instructions.

The goal of superscalar and superpipeline processors is to execute multiple instructions per cycle ("IPC"). Instruction-level parallelism ("ILP") available in programs can be exploited to realize this goal, however, this potential parallelism requires that instructions be dispatched for execution at a sufficient rate. Conditional branching instructions create a problem for instruction fetching because the instruction fetch unit ("IFU") cannot know with certainty which instructions to fetch until the conditional branch instruction is resolved. Also, when a branch is detected, the target address of the instructions following the branch must be predicted to supply those instructions for execution.

Recent processor architectures use a branch prediction unit to predict the outcome of branch instructions allowing the fetch unit to fetch subsequent instructions according to the predicted outcome. Branch prediction techniques are known that can predict branch outcomes with greater than 95% accuracy. These instructions are "speculatively executed" to allow the processor to make forward progress during the time the branch instruction is resolved. When the prediction is correct, the results of the speculative execution can be used as correct results, greatly improving processor speed and efficiency. When the prediction is incorrect, the completely or partially executed instructions must be flushed from the processor and execution of the correct branch initiated.

Early processors executed instructions in an order determined by the compiled machine-language program running on the processor and so are referred to as "in-order" or "sequential" processors. In superscalar processors multiple pipelines can simultaneously process instructions only when there are no data dependencies between the instructions in each pipeline. Data dependencies cause one or more pipelines to "stall" waiting for the dependent data to become available. This is further complicated in superpipelined processors where, because many instructions are simultaneously in each pipeline, the potential quantity of data dependencies is large. Hence, greater parallelism and higher performance are achieved by "out-of-order" processors that include multiple pipelines in which instructions are processed in parallel in any efficient order that takes advantage of opportunities for parallel processing that may be provided by the instruction code.

In any event, processors capable of providing this parallelism, and operating at very high frequencies, require millions of densely integrated transistors. Concomitantly however, high density devices operating at very high clock speeds can result in potentially damaging heat generation even at relatively low operating voltages. Conventional processors, which operate at what are today considered to be high frequencies with transistor counts in the 10s of millions, are generally designed to continually operate within worst case constraints of thermal and transient power conditions. These constraints place an upper bound on the performance of the processor which can actually be much lower than the peak performance of which the device is capable. Statistically however, not all critical circuits are at their maximum active levels even when the chip is at its peak processing speed but current analysis models assume the worst combination.

Currently there are processors which can step down their internal clock until they achieve a minimum power consumption level. This power down state is entered due to the automatic detection of idle activity and the chip is powered back to nominal clock levels upon receipt of a non-masked interrupt. Some other implementations suspend execution while others continue to execute instructions while the clock frequency is being modified.

SUMMARY OF THE INVENTION

The system and method for thermal overload detection and protection for an integrated circuit processor of the present invention allows the processor to run at near maximum potential for the vast majority of its execution life. This is effectuated by the provision of circuitry to detect when the processor has exceeded its thermal thresholds and which then causes the processor to automatically reduce the clock rate to a fraction of the nominal clock while execution continues. When the thermal condition has stabilized, the clock may be raised in a stepwise fashion back to the nominal clock rate. Throughout the period of cycling the clock frequency from nominal to minimum and back, the program continues to be executed.

The system and method of the present invention is of particular utility in allowing a given processor to position its nominal clock rate at a higher frequency than traditional worst case design rules would otherwise permit. Nevertheless, with this elevated nominal clock, there are possible conditions in which the processor might experience thermal and transient power conditions that would threaten the short and long term reliability of the processor.

In this latter regard, disclosed herein are two mechanisms which can selectively throttle the execution rates of the processor. A first ensures against a surge in processor activity from near idle to near full capacity in an extremely short time period causing a concomitant current demand in excess of the capability of the local power supply. The resultant drop in the supply voltage by this excessive current demand threatens noise margins and reduces the designed to integrity of the clock.

The second mechanism addresses a condition which can threaten the long term reliability of the processor such as when it operates at its full potential for relatively long periods resulting in an increase in the temperature of the integrated circuit die beyond acceptable levels. Actual physical damage to the silicon can result from operating at levels beyond the capability of the package (inclusive of the die and physical support apparatus) to remove heat.

In the first instance, short term transient conditions that cause problems with the supply voltage are designed to be detected in every major functional unit of the processor. These "governors" detect and control the rate of acceleration of a functional unit from idle to full throttle by a localized stall mechanism at the boundary of each stage in the pipe. As such, all queues and windows in the design can detect when they are at the "high water mark" of queue throughput and create a stall condition back to each respective queue activity source which is responsible for filling the queue. This mechanism can also detect when an idle queue is suddenly overwhelmed with input such that over a short period of approximately 10–°machine cycles, the queue activity rate has increased from idle to near stall threshold. The mechanism functions not to limit the maximum processing rate of the processor but rather to control the rise time of activity in all major functional areas from at or near idle to at or near full speed.

The second aspect of the present invention addresses long term device reliability by guarding against excess thermal conditions that could cause harm to the die. A thermal sensing circuit and method is provided herein that incorporates a programmable threshold which, when reached, causes the circuit to generate a non-masked interrupt to the processor which, in an exemplary embodiment, may be identical to a power down "Energy Star" interrupt. The internal phase-locked loop ("PLL") clock dividers may be employed to step down the master clock from nominal to, for example, $\frac{1}{64}^{th}$ of the nominal rate. Program execution would then continue at this lowered or reduced clock rate until the thermal sensing circuit again senses that a temperature threshold has been crossed, whereupon it may again issue a non-masked interrupt to raise the clock back to nominal frequency. As before, normal program execution commences at the conclusion of the interrupt.

Particularly disclosed herein is a processor including a plurality of instruction processing units having instruction queues therebetween. The processor comprises a queue activity detector for monitoring at least one of the instruction queues and having a predetermined activity rise time level threshold therefor. The queue activity detector asserts a stall signal to an activity source on the instruction queue when the threshold is exceeded and de-asserts the stall signal when the threshold is no longer exceeded.

Also disclosed herein is a method for moderating current demand in an integrated circuit processor comprising a plurality of instruction processing units having instruction queues therebetween. The method comprises the steps of establishing a predetermined instruction activity rise time threshold for at least one of the instruction queues and monitoring an instruction activity level on the at least one of the instruction queues. The method further comprises the steps of asserting a stall signal to an activity source on the at least one of the instruction queues when the threshold is exceeded and de-asserting the stall signal when the threshold is no longer exceeded.

Further disclosed herein is an integrated circuit processor including a plurality of instruction processing units having instruction queues therebetween. The processor comprises a thermal sensing circuit in thermal contact with the processor. The thermal sensing circuit has a predetermined thermal threshold thereof and produces a first output signal on an output thereof when the predetermined thermal threshold is crossed in a first direction. A clock circuit provides a clocking signal to the processor and is coupled to the output of the thermal sensing circuit. The clock circuit is operative to reduce a frequency of the clocking signal to a reduced frequency thereof when the first output signal is received. In a more particular embodiment, the thermal sensing circuit has an additional predetermined thermal threshold and produces a second output signal on the output when the additional predetermined thermal threshold is crossed in a second opposite direction to cause the clock circuit to increase the frequency of the clock signal back towards a nominal frequency.

Still further disclosed herein is a method for controlling an operating temperature of an integrated circuit processor which comprises the steps of establishing a predetermined thermal threshold for the processor and reducing a frequency of a clocking signal to the processor from a nominal frequency thereof to a reduced frequency thereof in response to the predetermined thermal threshold being exceeded.

BRIEF DESCRIPTION OF THE DRAWINGS

The aforementioned and other features and objects of the present invention and the manner of attaining them will become more apparent and the invention itself will be best understood by reference to the following description of an exemplary embodiment taken in conjunction with the accompanying drawings, wherein.

DESCRIPTION OF AN EXEMPLARY EMBODIMENT

Figure 1:
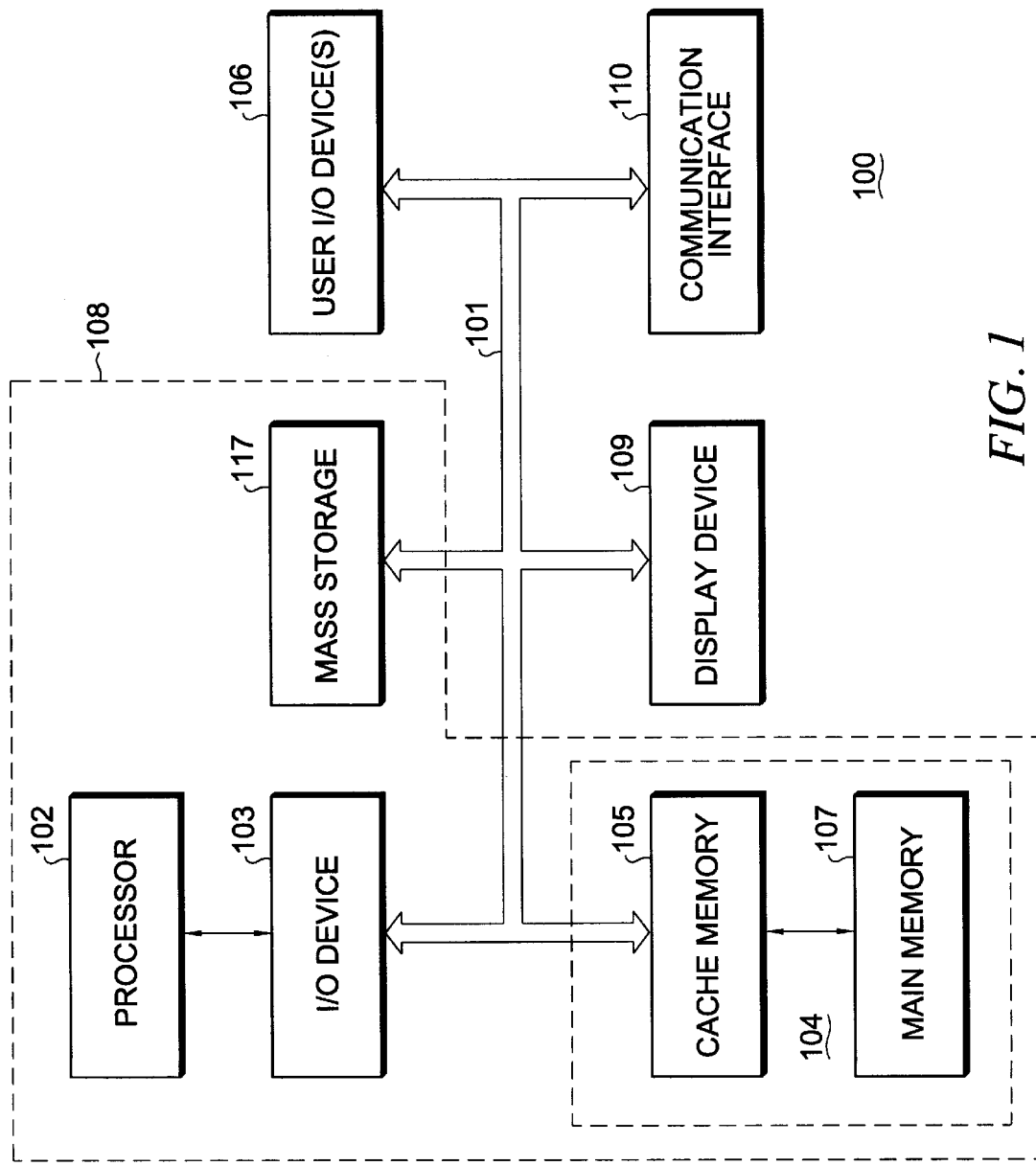
FIG. 1 is a functional block diagram of a computer system incorporating an apparatus, system and method in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
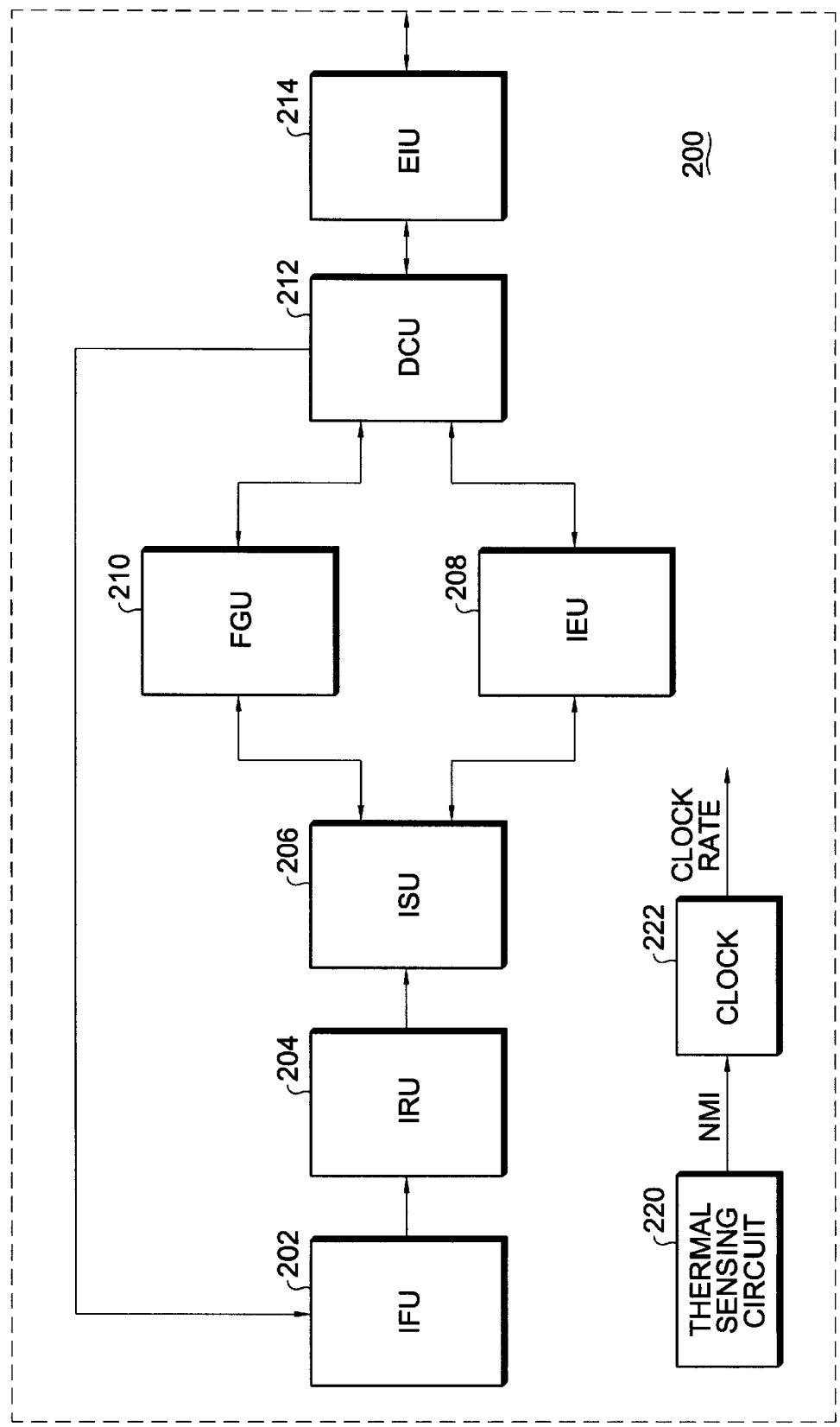
FIG. 2 is a functional block diagram of an integrated circuit implementation of a processor incorporating a thermal sensing circuit, for example, integrated as a portion of the processor die, in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle ("IPC"). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output ("I/O") device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Communication interface 110 is also coupled to the bus 101. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates the principle components of a monolithically integrated circuit processor 200 implementation of the processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit ("IFU") 202 comprises instruction fetch mechanisms and includes, among other things, an instruction cache for storing instructions, branch prediction logic, and address logic for addressing selected instructions in the instruction cache. The instruction cache is commonly referred to as a portion ("I$") of the level one ("L1") cache with another portion ("D$") of the L1 cache dedicated to data storage. IFU 202 fetches one or more instructions at a time by appropriately addressing the instruction cache. The instruction cache feeds addressed instructions to instruction rename unit ("IRU") 204. Preferably, IFU 202 fetches multiple instructions each cycle and in a specific example fetches eight instructions each cycle.

In the absence of conditional branch instruction, IFU 202 addresses the instruction cache sequentially. The branch prediction logic in IFU 202 handles branch instructions, including unconditional branches. An outcome tree of each branch instruction is predicted using any of a variety of available branch prediction algorithms and mechanisms. More than one branch can be predicted simultaneously by supplying sufficient branch prediction resources. After the branches are predicted, the predicted address is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent false dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been issued to an execution pipeline but has not yet completed or been retired. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to precisely handle instructions with a limited number of dependencies using a limited number of resources (i.e., registers). Complex instructions include any instructions that require more than the limited number of resources or involve more than the limited number of dependencies. IRU 204 includes mechanisms to translate or explode complex instructions into a plurality of microinstructions. These microinstructions are executed more efficiently in the execution units (e.g., floating point and graphics execution unit ("FGU") 208 and integer execution unit ("IEU") 214) than could the macroinstructions.

ISU 206 receives renamed instructions from IRU 204 and registers them for execution. Upon registration, instructions are deemed "live instructions" in the specific example. ISU 206 is operative to schedule and dispatch instructions as soon as their dependencies have been satisfied into an appropriate execution unit (e.g., integer execution unit (IEU) 208 or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to register files and control registers upon complete execution of an instruction. ISU 206 is responsive to exception conditions and discards operations being performed on instructions subsequent to an instruction generating an exception in the program order. ISU 206 quickly remove instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

A data cache memory unit ("DCU") 212 including cache memory 105 shown in FIG. 1 functions to cache memory reads from off-chip memory through external interface unit ("EIU") 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

The integrated circuit processor 200 shown also comprises a thermal sensing circuit 220 operatively coupled to the processor 200 clock in order to implement one aspect of the system and method of the present invention as will be more fully described hereinafter with respect to FIG. 5.

Figure 3:
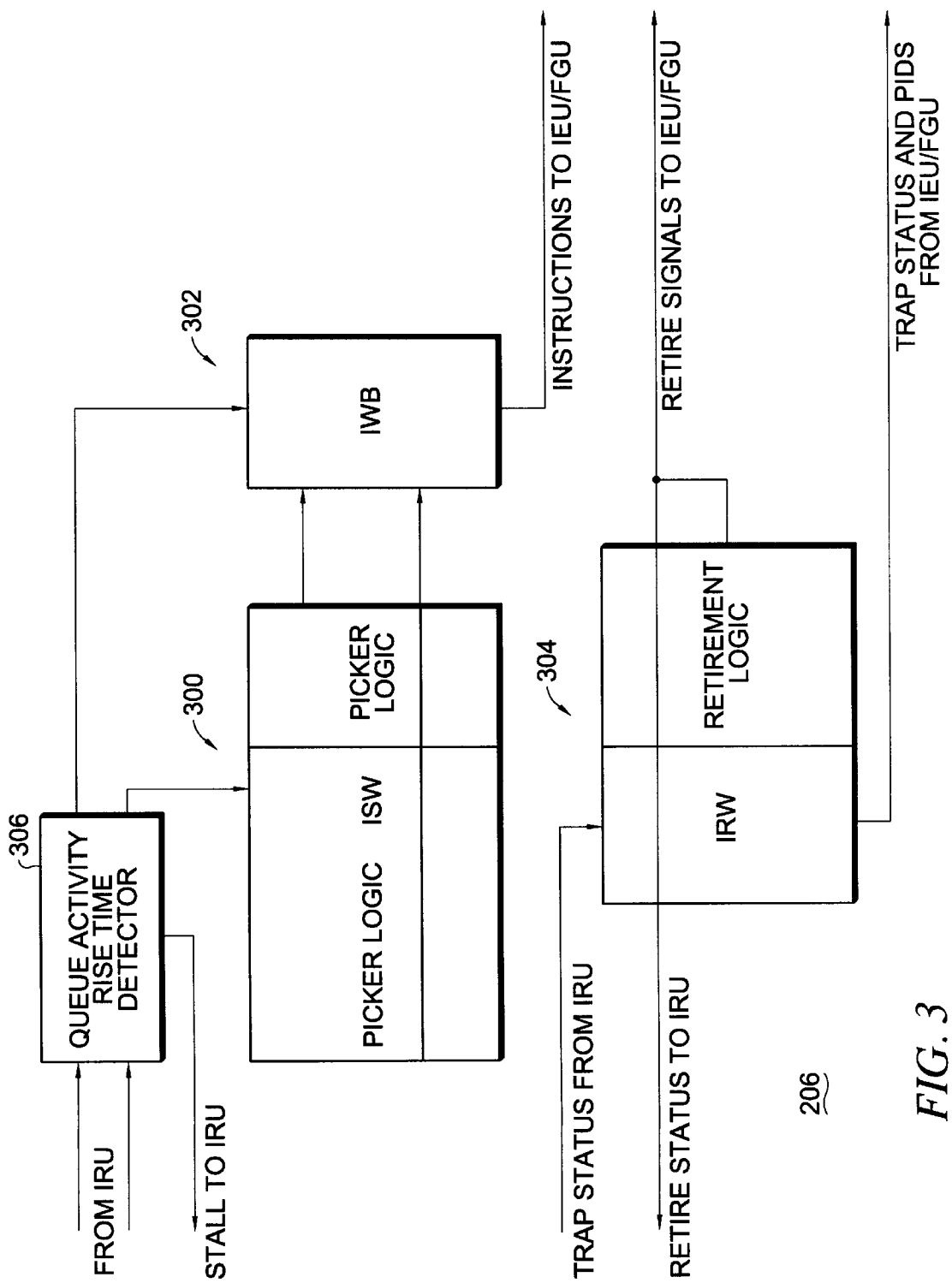
FIG. 3 is a more detailed functional block diagram of an exemplary instruction unit, for example, the instruction scheduling unit ("ISU"), forming a portion of the processor of the preceding figures which incorporates a queue activity rise time detector in accordance with the present invention.

With reference additionally now to FIG. 3, an exemplary instruction unit of the processor 102 is shown for purposes of illustrating yet another aspect of the system and method of the present invention. The instruction unit illustrated is the ISU 206 of FIG. 2. Which is responsible for a number of the processor 102 functions including:

scheduling the instructions for execution as soon as their dependencies have been satisfied;

maintaining the trap status of all the instructions;

maintaining the architectural program counter and other special registers;

maintaining the correct architectural state of the machine in spite of executing instructions out-of-order;

redirecting the execution appropriately for traps and interrupts; and ensuring fairness amongst the various threads by appropriately throttling thread fetching and thread scheduling when the machine is operating in multithreaded mode.

The ISU 206 contains several structures which are shown in detail in FIG. 3. The IRU 204 (FIG. 2) sends 8 instruction bundles containing the instructions, the dependency information regarding the instructions (encoded through producer identifications "PIDs"), and the trap status of the instructions to the ISU 206. The dependency status along with the instruction ready status and other information such as the expected latency of the instruction is stored in the instruction scheduling window ("ISW") 300 while the instruction itself is stored in the instruction wait buffer ("IWB") 302. The ISW 302 is folded for reasons of timing as will be more fully described hereinafter and has instruction pickers residing on both sides. The instruction pickers pick the instructions that are ready for execution by generating the appropriate word lines for the IWB 302 so that the instructions can be read out to be issued to the execution units. The instruction as well as the identification of the instruction is sent out to the execution units so that the execution units can respond back with the trap and completion status. When the trap and completion status of an instruction arrives from the execution units, they are written into the instruction retirement window ("IRW") 304. The retirement logic looks at contiguous entries in the IRW 304 and retires them in order to ensure proper update of architectural state.

In the embodiment illustrated and described, the processor 102 can have 128 instructions alive at any given time and there is a 1—1 correspondence between the entries in all the structures in the ISU 206 and the dependency checking table ("DCT") which resides in the IRU 204. The ISW 300, the IWB 302, and the IRW 304 contain 128 entries with each entry corresponding to one of the live instructions in the processor 102. Since helpers are generated in the first stage of register renaming, there may be cases where multiple entries correspond to a single complex instruction. In the case where multiple entries correspond to a single instruction, the entries are all contiguous and the last entry will be marked as an instruction boundary to facilitate instruction retirement.

Figure 4:
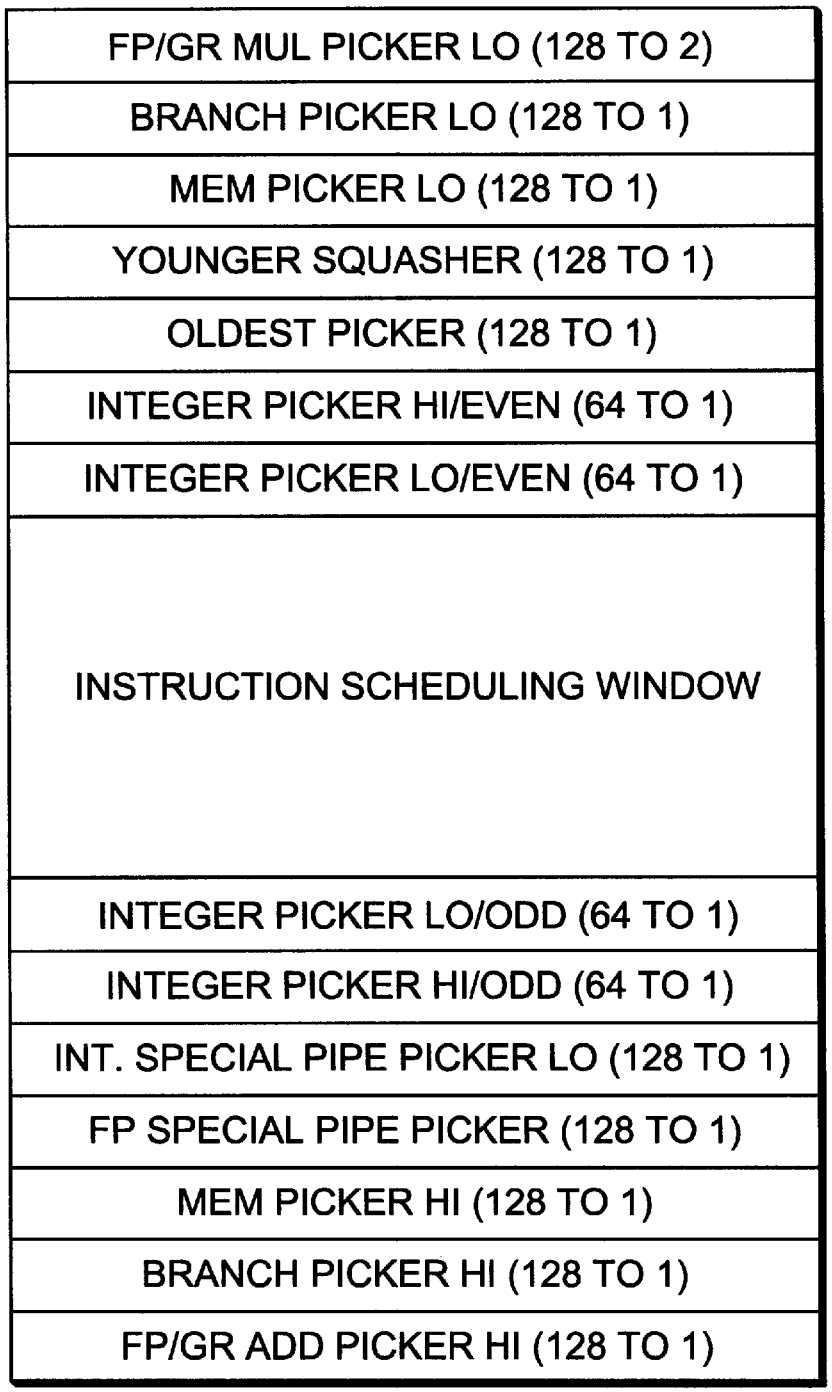
FIG. 4 is a representative overview of the instruction scheduling window ("ISW") and pickers forming a portion of the ISU of FIG. 3.

With reference additionally now to FIG. 4, the ISW 300 is illustrated in greater detail. Each entry contains 3 PID fields, which are indices of older instructions upon whose results the current instruction is dependent. While there are dependencies that have not been satisfied (older instructions have not yet completed to produce the results), the entry remains not ready. Once all the dependencies have cleared, the entry becomes ready. The pickers monitor the readiness state of all the entries and choose the oldest ready instructions for issue. Instructions entries that are issued broadcast that information so that younger dependent instruction entries can become ready and be issued.

Instruction entries pass through 5 states while in the scheduling window:

Initialized: this is generally the state of new entries as they are written into the scheduling window (though they can be in the "Ready" state if all source operands are available). Entries in this state are waiting for older instructions to generate needed results. The valid bit is set and other control state (such as the latency counter, instruction type, etc.) is initialized.

Ready: entries move to this state when all 3 potential dependencies (indicated by PIDs) are satisfied. One of the entry's 8 ready bits goes active.

Issued: transition to this state occurs when the picker associated with the active ready bit sends back a signal announcing the entry has been picked for issue. The latency counter (described in more detail hereinafter) begins to count down.

Completed: entries move into this state once they have been issued and the latency counter=0 (results would be available to instructions issued in the next cycle).

Retired (Invalid): entries move into this state once they have been retired (results written from result buffer to register file) or when a flush happens that invalidates the entry (bad prediction, trap, etc.). The valid bit is cleared.

Each entry activates 1 of its several ready bits once it determines that all its dependencies have cleared. These ready bits feed a set of "picker" structures that apply an algorithm for selecting which of the ready instructions to dispatch in that cycle. This information is passed back into the entries and combined with information about the latency of the instructions (maintained within the entry) to determine when to broadcast completion status. Each entry in the window broadcasts its completion state (i.e., has been issued and its results available) on a wire (called "sdisp") that spans the ISW 300. Every entry also has three 128-bit wide multiplexers that select, via decode of the 3 PID fields, the correct completion signal to watch. An entry is ready for issue when the logical AND of all three multiplexer outputs is active.

Because of the length of the wires involved and the loading on each of them (3*128 multiplexer inputs), it takes a complete cycle to complete this process. Therefore, it is not possible to pick a single cycle latency instruction for issue and communicate the completion information to dependent instructions all within 1 cycle. This requires a means of handling the latency sensitive applications involving dependency chains of single-cycle latency operations. The fast ready mechanism provides this capability.

The fast ready mechanism is similar to the slow ready one, except that its scope is limited to the nearest 8 younger instructions to a completing instruction. A separate set of completion wires ("fdisp") and multiplexers is used. Each entry drives a completion signal to its 8 neighboring younger entries, each of which has 3 8-to-1 multiplexers selecting based on the 3 PID fields. Ready then becomes an OR-AND function: each fast ready multiplexer output is ORed together with the corresponding slow ready multiplexer output, and those results are ANDed together.

As currently contemplated, only the integer execution pipes will support single cycle latency instructions, so the fast ready mechanism need only incorporate issue information from the integer pickers. All other pipelines can have a minimum 2 cycle latency, which means the slow ready mechanism is adequate for communicating completion information. However, due to anticipated bypassing restrictions in the integer datapath, the fast ready mechanism may need to incorporate information from the memory pipelines pipes as well.

The integer datapath is broken into 2 symmetric banks of pipelines, each containing 2 integer pipes, 1 memory pipe, and 1 branch pipe. Bypassing of results with 0 latency (used the cycle following the completion of the producing instruction) is only supported among pipes within each bank. Bypassing of results between banks (result produced in one bank, used in the other) requires 1 additional cycle of latency due to physical design constraints.

Effectively, this means that the availability of results for use by dependent instructions has variable latency, depending on whether the producer and the consumer of the data go to the same or different banks. Without some mechanism to steer dependent instructions to the same execution bank as the producers, all instructions going to the integer datapath would require an additional cycle of latency to allow for bypassing.

Instruction coloring preassigns entries in the ISW 300 to one of the two execution banks (arbitrarily named "hi" and "lo") in the integer pipeline and the means for achieving this is discussed in more detail hereinafter. Each entry enables a ready bit for a particular bank according to a preassigned color, leaving the ready for the complementary bank turned off, guaranteeing that the instruction can only be picked to be executed in the preassigned bank.

The fast ready mechanism is enhanced such that it communicates the bank (color) in which a producing instruction was executed. That information can be used to override the preassigned color of the dependent instruction to match that of the producer so that it is possible to avoid the extra cycle needed to support bypassing across the execution banks. To support this, the fast ready mechanism may use 2 sets of completion wires ("fdisp_hi" & "fdisp_lo") along with 2 sets of 8-to-1 multiplexers (3 multiplexers per set), one set for each of the 2 colors. Each entry enables the fast completion wire corresponding to its color (the bank where it was executed). One of the 2 colors of ready bits is activated in dependent entries based on which set of the 3 fast ready multiplexers produces an active output.

An instruction can only be ready if all the instructions producing the results it depends on were executed in the same bank, or any dependencies that come from the other bank completed at least 1 cycle earlier. Note that the slow ready mechanism does not need to carry this color information, because it already requires the extra cycle latency that allows full bypassing across the execution banks. So instructions readied by the slow ready mechanism always take their default color. This also implies that dependencies that span more than 8 instructions are forced to have an additional cycle of latency to wait for full bypassing.

The pickers for the memory and branch pipes are implemented as 2 independent pick oldest of 128 structures, fed by separate sets of "hi" and "lo" ready bits. Therefore, each entry must generate separate hi and lo ready bits for memory instructions and branch instructions, for a total of 4 ready bits (so far . . . ). Due to the timing constraints of the fast ready path, the integer pickers are implemented as 4 independent pick 1 oldest of 64 structures. The ISW is divided into 2 halves of even and odd entries. Even entries are selected by 2 of the pickers, and odd entries are selected by the other 2 pickers. Coloring is used within the 2 halves, so there is a hi picker and a lo picker for the even and odd sides of the window. Each entry generates a hi and a lo integer ready bit.

The method for preassigning the color of entries as they are written into the ISW 300 is based on the physical location in the window, where every consecutive pair of entries (e.g. 0 & 1, 2 & 3, . . . ) is assigned alternating colors. For example, if entries 0 & 1 are assigned to the hi bank, entries 2 & 3 would be assigned to the low bank, and so on. This scheme equally distributes instructions across the pipelines, but has the potential downside of having a regular cadence that could be hit by critical code loops such that all the instructions of a given type get steered to the same pipeline, starving the other available resources, and yielding much worse performance than the processor 102 would otherwise be capable of delivering.

Full bypassing is supported between all the floating point/graphics pipelines, so coloring is unnecessary for these pipelines. Each entry produces 1 ready bit for the FP/GRadd pipes, and 1 ready bit for the FP/GRmul pipes. These feed corresponding pick 2 oldest out of 128 structures. As a result, the total number of ready bits generated by each entry is 8.

There may be some cases where 2 additional cycles of latency are required to bypass results between certain combinations of instructions within the FP/Graphics unit. The physical reason is that these cases are not supported by the bypassing multiplexer hardware, so results must come from the result buffer (there is a 2 cycle latency from execution completion to writing the results into the result buffer). The cases of concern are the so-called "evil-twin/cross-precision" operations. The issue is that a given instruction entry has no information about which instructions are dependent upon its results, so it has no way of knowing that it should delay broadcasting its completion by 2 extra cycles when a dependent instruction causes one of these cases (plus, there may be other dependent instructions that can use the results via the bypass multiplexers). Therefore, no special action is taken by the producing instructions entry in these cases. The mechanism for handling these cases works on the receiving end (i.e., in the dependent instructions window entry). Dependent instructions that fit these cases are marked by the DCT in the IRU 204. Any so marked instruction inserts an extra 2 cycle delay between the time that its dependency clears and the activation of its ready bit. In the implementation shown, it is assumed that there is just one such flag per entry, so that if any of the 3 possible dependencies results in one of these cases, the 2 cycle delay will be inserted after the last dependency is cleared, whether or not that is the dependency that really causes the problem. Alternatively, it may be feasible to separately mark each dependency (PID) and insert the 2 cycle delay relative to the clearing of each separate one.

There is a special pipeline in the Integer datapath and two special pipelines in the FP/GR datapaths. These special pipelines handle long latency instructions (e.g., integer mul/div, FP div/sqrt) and other special instructions that aren't handled by any of the regular pipelines. Rather than dedicate full separate datapaths (specifically register file and result buffer ports) to handle these special instructions, they may be dispatched to the existing integer or FP/GR pipelines, which then forward them on to the special hardware required for their execution.

Only one special instruction may be executing at a time within the integer datapath and two instructions in the special pipelines in the FP/GR datapaths. A special mechanism is required to ensure that only the oldest entry containing a special instruction turns on its ready bit. This is accomplished using special flags, one bit for the integer side and one for the FP/GR side, that feed picker structures that identify the oldest such entry which generate signals that go back to the window to tell all younger special entries to keep their ready bit turned off.

Certain instructions must be executed in order relative to either older or younger instructions, or both. Examples of such instructions include those that modify special processor state (e.g., WRPR % pstate), atomics (e.g., CAS), and membars. These scheduling restrictions are enforced using the same kind of mechanism as the one described above for limiting issue of special pipe instructions. One picker-like structure monitors the retirement status of all entries, and generates signals that cause younger entries that have the appropriate flag set to squash their ready bits if any older entries have not retired. A second similar structure receives signals from all entries that indicate if younger instructions need to wait for a particular entry to retire before enabling their ready bits. Signals are generated to squash the ready bits of all younger instructions relative to the oldest instruction that has the appropriate flag set and has not yet retired. The 2 mechanisms operate independently, so a particular entry may invoke one or the other, or both.

The ISW 300 is physically folded, placing odd entities on one side and even entries on the other. This reduces the height by nearly 50%, which is beneficial for timing. Furthermore, the entries are interleaved as shown above to minimize the routing cost of having a circular queue. If the interleaving were not done, wires spanning the height of the window would be required for the fast ready mechanism.

Figure 5:
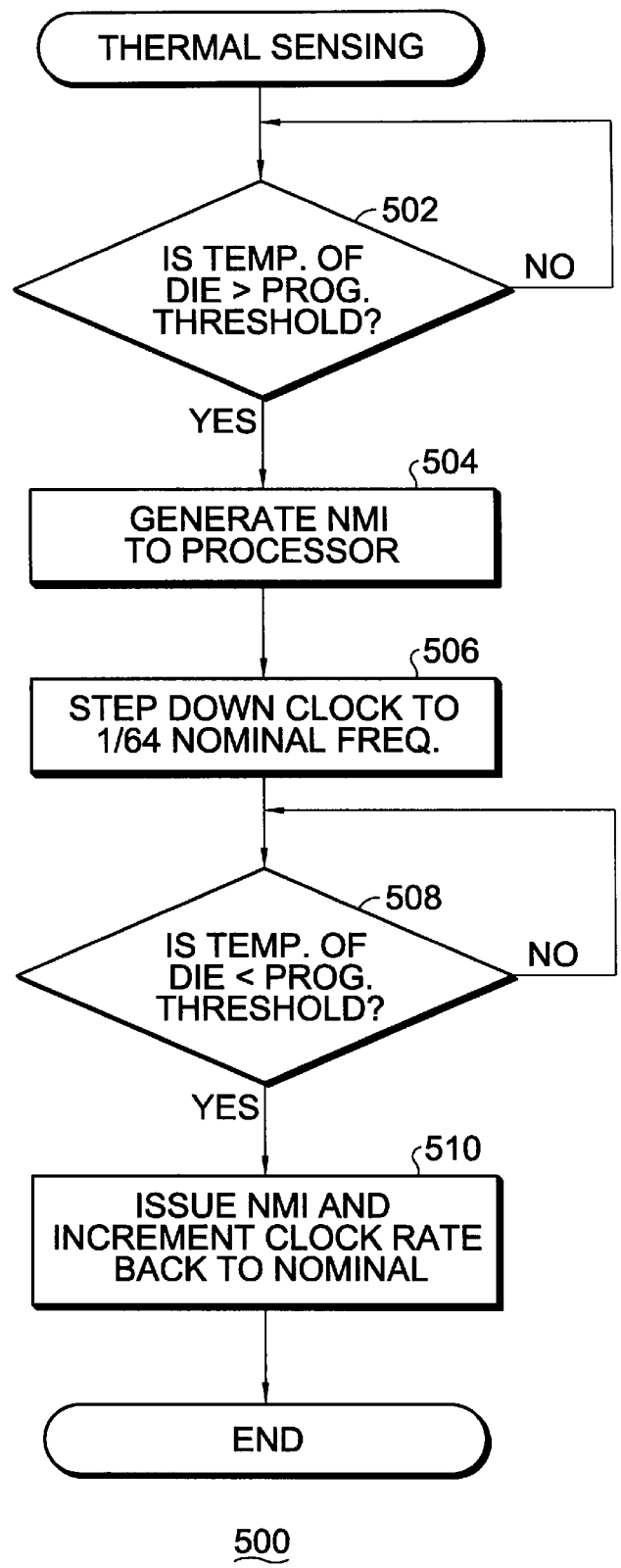
FIG. 5 is a representative logic flowchart illustrating the possible functionality of a thermal sensing circuit in accordance with the present invention as shown in FIG. 2.

With reference now to FIG. 5, a logic flow for a thermal sensing process 500 which may be utilized by the thermal sensing circuit 220 (FIG. 2) is shown. The process 500 monitors the temperature of the processor 200 at decision step 502 and, if the temperature exceeds or crosses a predetermined programmed threshold level, the process 500 proceeds to step 504. Otherwise, the monitoring continues at decision step 502. At step 504, a non-maskable interrupt ("NMI") is issued to the processor 200 and the output frequency of the clock 222 (FIG. 2) is decreased to a level of $\frac{1}{64}^{th}$ of its nominal frequency at step 506 although any other suitable fractional reduced rate may be chosen.

At this point, the process 500 proceeds to decision step 508 where the temperature of the processor 200 is again monitored to determine if the temperature has dropped below, or crossed, a second predetermined programmable threshold (which may or may not be the same level as the first threshold). If the temperature has not dropped below this second threshold level, the process 500 remains at decision step 508. Alternatively, if the temperature of the processor 200 is below the second threshold level, the thermal sensing circuit 220 (FIG. 2) issues another NMI to the processor 200 at step 510 and instructs the clock 222 (FIG. 2) to begin increasing the output clock rate back to its initial nominal level. This may be done in a stepwise incremental manner (i.e. from $\frac{1}{64}^{th}$ to $\frac{1}{32}^{nd}$ to $\frac{1}{16}^{th}$ to $\frac{1}{8}^{th}$ to $\frac{1}{4}^{th}$ to $\frac{1}{2}$ of the nominal frequency or in any other appropriate manner.

The system and method of the present invention addresses long term processor 200 reliability by guarding against excess thermal conditions that could cause harm to the die and the components integrated thereon. The thermal sensing circuit 220 and process 500 incorporates a programmable threshold which, when reached, causes the circuit to generate a non-masked interrupt to the processor 200 which, in an exemplary embodiment, may be identical to a power down "Energy Star" interrupt. The internal phase-locked loop ("PLL") clock dividers of the clock 222 may be employed to step down the master clock 222 from nominal to, for example, $\frac{1}{64}^{th}$ of the nominal rate. Program execution would then continue at this lowered or reduced clock rate until the thermal sensing circuit 220 again senses that a temperature threshold has been crossed, whereupon it may again issue a non-masked interrupt to raise the clock frequency back to nominal. As before, normal program execution commences at the conclusion of the interrupt.

Figure 6:
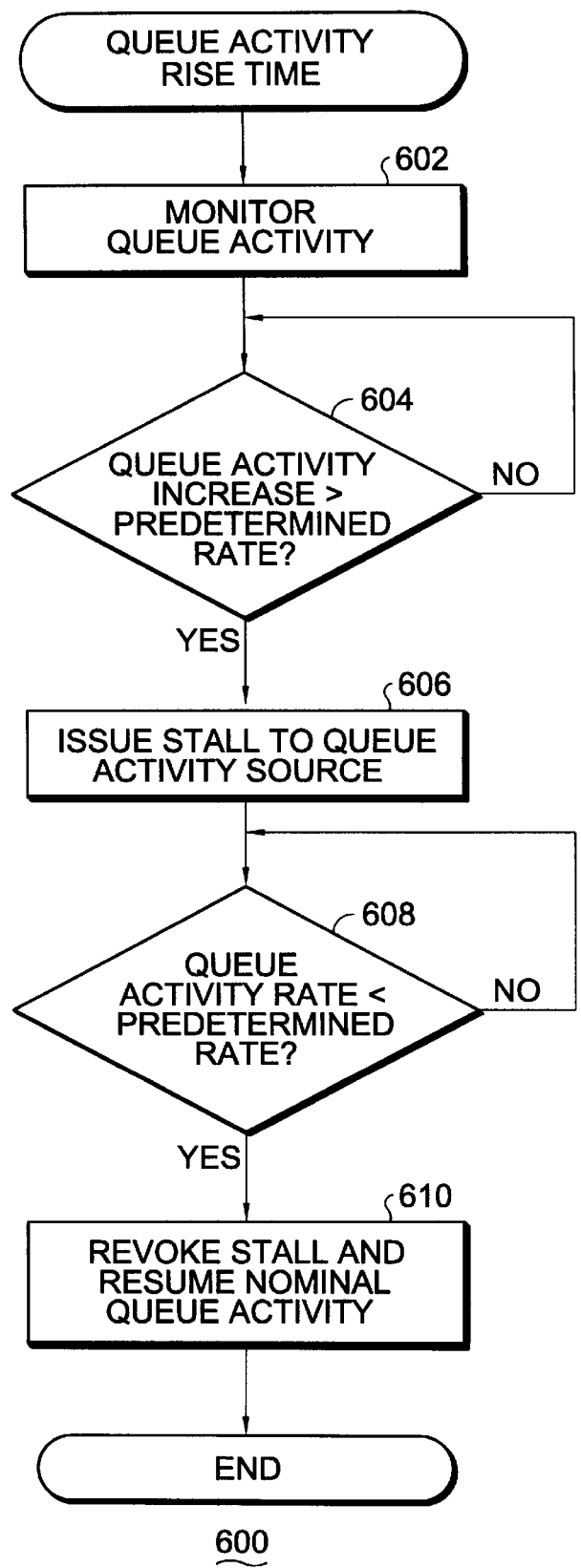
FIG. 6 is a further representative logic flowchart illustrating the possible functionality of a queue activity and rise time detector in accordance with the present invention as shown in FIG. 3.

With reference additionally now to FIG. 6, a logic flow diagram illustrates a process 600 for possible implementation with the queue activity rise time detector 306 of FIG. 3. The process 600 illustrates at step 602 that the queue activity rise time detector 306 continuously monitors instruction queue activity from a queue activity source. In the embodiment illustrated for exemplary purposes in FIG. 3, the ISU 206 contains a queue activity rise time detector 306 between the ISU 206 and the IRU 204 which, in this example, is the queue activity source.

At decision step 604, the queue activity rise time detector determines whether or not the rate of increase in queue activity has exceed a predetermined acceptable rate. If it has not, the process 600 loops at decision step 604. Alternatively, if the rate has exceeded the predetermined rate (for example, from at or near and idle state to at or near a stall condition in between approximately 10 to 20 processor cycles), the process 600 proceeds to step 606 wherein a "stall" signal is issued by the queue activity rise time detector 306 to the activity source (in the example shown, the IRU 204). The process 600 then stalls the activity source at decision step 608 until such time as the activity rate drops below a predetermined rate and, at that time, the stall signal is revoked and normal queue activity is resumed at step 610.

As previously noted, short term transient conditions which may cause problems with the supply voltage are designed to be detected in every major functional unit of the processor 200 in addition to the queue activity rise time detector 306 shown in conjunction with the ISU 206 in FIG. 3. These "governors" detect and control the rate of acceleration of a functional instruction unit from at or near idle to at or near full throttle by a localized stall mechanism at the boundary of each stage in the pipe. As such, all queues and windows in the design can detect when they are at the "high water mark" of queue throughput and create a stall condition back to each respective queue activity source which is responsible for filling the queue. This mechanism can also detect when an idle queue is suddenly overwhelmed with input such that over a short period of approximately 10–°machine cycles, the queue activity rate has increased from at or near idle to a near stall threshold. The queue activity rise time detector 306 and process 600 function not to limit the maximum processing rate of the processor 200 but rather to control the rise time of activity in all major functional areas from at or near idle to at or near full speed.

In the embodiment above described and shown, the integrated circuit processor 200 may be conveniently implemented utilizing 0.18 um design technology or those having greater or lesser device line widths. As presently contemplated, the processor 200 may utilize a clock frequency of 1 GHz or greater with six metal layers and an operating voltage of 1.5 volts. Metal layers 1–4 may have a minimum uncontacted pitch of 0.5 um while metal layers 5–6 may utilize somewhat coarser design rules of on the order of 3 um pitch. The processor 200 may be conveniently packaged in conventional flip-chip packaging or other suitable configuration. Transistors in the processor 200 may be drawn at 0.16 um minimum gate length. The SRAM cell size utilized for the L2 cache and L3 tags may be 6.0 $um^2$ and the L1 cache may be implemented with a 7.0 $um^2$ cell that exhibits somewhat higher performance.

The number of pipeline stages in the processor 200 is set with regard to achieving a 1 GHz cycle time and loops that need to execute in one cycle time occur in three places in the design as disclosed herein, the instruction next field address, the scheduling window picking logic and the integer ALU. All other paths may be pipelined to meet the cycle time goal.

As currently contemplated, the die size for the processor 200 may be approximately 18 mm×18 mm and a 512 KB L2 cache will occupy less than ¼ of the die area. The transistor count for the design ranges between 40–50 million and the pipeline must be carefully floor-planned in order to minimize routing between stages. Relatively long conductors present a significant constraint in minimizing cycle time. Double width and spaced metal 1–4 layer conductors can only extend about 6 mm in a cycle after allowing for flop and clocking signal overhead. The lower resistance metal 5–6 layers may have signals that can travel up to 17 mm in a cycle. The number of metal 5–6 layer signal conductors will likely be limited however, due to the fact that approximately 50% of these layers can be occupied by power and clock routing signals.

With the foregoing specification, estimated power consumption for the processor 200 is approximately 100 Watts at 1 GHz. With scaling of the processor 200 to higher operating frequencies, power and cooling systems must be designed to tolerate power consumption of on the order of 150 Watts or more (100 Amps at 1.5 volts).

While there have been described above the principles of the present invention in conjunction with a specific integrated circuit processor architecture, it is to be clearly understood that the foregoing description is made only by way of example and not as a limitation to the scope of the invention which may be utilized in conjunction with any high density integrated circuit intended to operate at high clock frequencies. Particularly, it is recognized that the teachings of the foregoing disclosure will suggest other modifications to those persons skilled in the relevant art.

Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A processor including a plurality of instruction processing units having instruction queues therebetween, said processor comprising:

a queue activity detector for monitoring at least one of said instruction queues and having a predetermined activity rise time level threshold therefor, said queue activity detector for asserting a stall signal to an activity source on said at least one of said instruction queues when said threshold is exceeded and de-asserting said stall signal when said threshold is no longer exceeded.

2. The processor of claim 1 wherein said threshold is exceeded when activity on said at least one of said instruction queues rises from substantially an idle condition to a substantially maximum throughput condition in substantially between 10–20 processor clock cycles.

3. The processor of claim 1 wherein said instruction processing units and said queue activity detector are monolithically integrated.

4. Apparatus for an integrated circuit processor including a plurality of instruction processing units having instruction queues therebetween; said apparatus comprising:

a queue activity detector for monitoring at least one of said instruction queues and having a predetermined activity rise time level therefor, said queue activity detector for asserting a stall signal to an activity source on said at least one of said instruction queues when said predetermined activity rise time level threshold is exceeded and de-asserting said stall signal when said predetermined activity rise time level threshold is no longer exceeded;

a thermal sensing circuit in thermal contact with said processor, said thermal sensing circuit having a first selected programmable thermal threshold thereof and producing a first non-maskable interrupt when said first selected thermal threshold is crossed in a first direction and having a second selected programmable thermal threshold thereof and producing a second non-maskable interrupt when said second selected programmable threshold is crossed in a second direction; and a clock circuit for providing a clocking signal to said processor, said clock circuit being selectably operable responsive to the first non-maskable interrupt generated by said thermal sensing circuit, said clock circuit operative to reduce a frequency of said clocking signal to a reduced frequency thereof responsive to reception of said first non-maskable interrupt and selectably operable responsive to the second non-maskable interrupt generated by said thermal sensing circuit, said clock circuit operative to increase the frequency of said clocking signal above the reduced frequency thereof responsive to reception of said second non-maskable interrupt.

5. The processor of claim 4 wherein said reduced frequency is substantially 1/64th of a nominal frequency.

6. The processor of claim 4 wherein said first direction is opposite of said second direction.

7. The processor of claim 6 wherein said first selected programmable threshold and said second selected programmable threshold are substantially coextensive.

8. The processor of claim 6 wherein said clock circuit is responsive to said second non-maskable interrupt to increase a frequency of said clocking signal from said reduced frequency thereof toward a nominal frequency.

9. The processor of claim 8 wherein said clock circuit increases said frequency of said clocking signal in stepwise increments from said reduced frequency toward said nominal frequency.

* * * * *